United States Patent [19]

Ikeda et al.

[11] Patent Number: 5,506,836
[45] Date of Patent: Apr. 9, 1996

[54] ORTHOGONAL FREQUENCY DIVISION MULTIPLEX DEMODULATION

[75] Inventors: Yasunari Ikeda, Kanagawa; Toshihisa Hyakudai, Chiba; Osamu Ito, Tokyo; Yoshikazu Miyato, Chiba, all of Japan

[73] Assignee: Sony Corporation, Tokyo, Japan

[21] Appl. No.: 281,169

[22] Filed: Jul. 27, 1994

[30] Foreign Application Priority Data

Jul. 28, 1993 [JP] Japan .................... 5-186097

[51] Int. Cl.⁶ .................................... H04J 11/00
[52] U.S. Cl. ................................ 370/19; 375/326
[58] Field of Search ................. 370/18, 19, 20, 370/21, 69.1, 50, 100.1, 105.4, 105.5, 106, 23, 70; 375/326, 327

[56] References Cited

U.S. PATENT DOCUMENTS 5,191,576  3/1993  Pommier et al. .................... 370/18
5,228,025  7/1993  Le Floch et al. .................... 370/20
5,406,551  4/1995  Saito et al. ......................... 370/19

*Primary Examiner*—Wellington Chin
*Assistant Examiner*—Ajit Patel
*Attorney, Agent, or Firm*—William S. Frommer; Alvin Sinderbrand

[57] ABSTRACT

An orthogonal frequency division multiplex (OFDM) demodulation apparatus which accurately reproduces a clock and accurately generates a time window for discrete Fourier transformation (DFT) for stable demodulation of an OFDM modulated signal, wherein a clock reproduction circuit of the OFDM demodulation apparatus includes a Costas computation circuit and processes a signal corresponding to the specific carrier wave signal of a predetermined single wave for each symbol out of the I and Q channel signals obtained by subjecting the OFDM modulated signal to DFT to generate a control voltage using the Costas computation circuit and low pass filters and operates a voltage control oscillator to reproduce a clock signal. The clock signal is divided to produce the time window signals used in the DFT circuit.

10 Claims, 10 Drawing Sheets

ORTHOGONAL FREQUENCY DIVISION MULTIPLEX DEMODULATION

BACKGROUND OF THE INVENTION

1. Field of the Invention

The present invention relates to a digital demodulation apparatus for digitally demodulating a signal, more particularly to an orthogonal frequency division multiplex (OFDM) demodulation apparatus for demodulating an OFDM signal having 0 as the amplitude of a specific frequency component.

2. Description of the Related Art

When transmitting digital signals, there are known the methods of phase modulation (PM) or amplitude modulation (AM) of a single frequency carrier wave signal based on a digital signal.

As a specific example of such modulation methods, there are known phase shift keying (PSK) for changing only the phase of the carrier wave signal and quadrature amplitude modulation (QAM) for changing both the phase and the amplitude of the carrier wave signal.

In the above modulation methods, the single frequency carrier wave signal is modulated so as to have an occupied bandwidth of an extent fitting in the transmission band.

Recently, as a new modulation method, proposal has been made of the modulation method known as the orthogonal frequency division multiplex (OFDM) modulation method.

In OFDM modulation, a plurality of orthogonal carrier wave signals are generated in the transmission band to divide the transmission band and the carrier wave signals are each subjected to PSK processing or QAM processing by digital signals.

Since OFDM modulation divides the transmission band by a plurality of carrier wave signals, the band per carrier wave signal becomes narrow and the modulation time per carrier wave signal becomes long. When the transmission band is the same, however, the overall transmission time obtained as a result of the modulation of each of the plurality of the carrier wave signals is no different from the modulation methods used widely previously, for example, the PSK and QAM methods.

In OFDM modulation, a plurality of carrier wave signals are transmitted in parallel, so the transmission rate per digital data to be transmitted, that is, symbol, becomes slower. In a transmission path with so-called multiple path interference, it is possible to reduce the relative delay time of the multiple path interference wave with respect to the time length for symbols. As a result, OFDM modulated signals are resistant to the effects of multiple path interference. Application of OFDM modulation to transmission of digital signals by earth waves taking advantage of this point is drawing great interest.

For signal processing in OFDM modulation, it is necessary to perform inverse discrete Fourier transformation (IDFT) at a high speed, while for signal processing in OFDM demodulation, it is necessary to perform discrete Fourier transformation (DFT) at a high speed.

In the past, it was difficult to realize such signal processing inexpensively and at a high speed, but recent advances in electronics technology and semiconductor technology have made possible the provision of semiconductor devices which can perform DFT and IDFT efficiently by hardware-like processing and electronic circuits using the same. Accordingly, it has become possible to perform OFDM modulation, or OFDM demodulation, using such semiconductor devices and electronic circuits.

The characterizing feature of OFDM modulation is that orthogonal carrier wave signals are generated for each predetermined bandwidth obtained by dividing a transmission channel (transmission band), but that the OFDM modulated signals are digital signals of a low data transmission rate which can fit in their respective bandwidths and that the individual carrier wave signals are not modulated by digital signals, but all carrier wave signals are modulated all at once by IDFT processing.

A summary of the OFDM modulation will be given below.

On the transmission side performing the OFDM modulation, waveforms of carrier wave signals corresponding to the values "1" or "0" of the digital data to be transmitted are defined for the plurality of carrier wave signals #1 to #n. By adding up and combining the carrier wave signals #1 to #n showing the values of the digital data to be transmitted, OFDM modulated signals are obtained. That is, if these carrier wave signals #1 to #n are arranged in order on the frequency axis and the amplitude and phase of the carrier wave signals are defined by the digital data to be transmitted, it is possible to define the waveform of the data (symbols) of the OFDM modulated signals in a predetermined time length by the digital data to be transmitted.

At the receiving side which demodulates the OFDM modulated signals, the OFDM modulated signals are received and the waveforms of the carrier wave signals are discriminated to establish correspondence with digital data, whereby it is possible to demodulate the OFDM modulated digital data sent from the transmission side for each carrier wave signal.

In OFDM modulation, it is possible to transmit the digital data by defining the carrier wave signals by two phase states and modulating them by the binary PSK (BPSK) method and also possible to define a large number of phases and amplitudes and transmit the data in multilevels.

Digital data given multiple values for each of a plurality of carrier wave signals is transmitted by defining the amplitude and phase of the carrier wave signals and obtaining the waveforms of the same. The processing operation for obtaining the waveforms is the so-called IDFT processing. Therefore, in OFDM modulation, it is possible to obtain an OFDM modulated signal using an IDFT circuit.

Conversely, the OFDM modulated signals obtained by IDFT processing in this way can be demodulated by DFT processing on the receiving side.

However, in a transmission path with multiple path interference, there is the problem that it is difficult to accurately detect the synchronization symbol duration due to the leakage of signals into the synchronization symbol duration or noise entering into the synchronization symbol duration in a transmission path with noise.

Further, when viewed from the perspective of transmission of data, there is the problem of deterioration of the transmission efficiency due to insertion of the synchronization symbol. From this viewpoint, it is desired to reduce to an extreme the number of the synchronization symbols.

On the other hand, from the viewpoint of the stable operation of the PLL circuit performing the reproduction of the clocks and the DFT circuit performing demodulation of the received signals, there is the problem that it is not desirable to reduce the number of the synchronization symbols since reduction of the synchronization signals means a reduction of the reference signals.

SUMMARY OF THE INVENTION

The present invention was made in consideration of the above problems and has as its object the provision of an OFDM demodulation apparatus which enables stable reproduction of a clock signal and as a result enables accurate demodulation of the OFDM modulated signal.

Another object of the present invention is to provide an OFDM demodulation apparatus which enables reproduction of a clock signal from an OFDM modulated signal not having a synchronization symbol inserted in it and thereby enables improvement of the transmission efficiency.

According to the present invention, there is provided an OFDM demodulation apparatus for demodulating an OFDM modulated signal which is comprised of a first component signal including a synchronization symbol and a second component signal including a synchronization symbol in an orthogonal relationship with the first component signal, which component signals are multiplexed by orthogonal frequency division, which OFDM demodulation apparatus includes:

- a first signal extracting means for extracting a first component signal from the OFDM modulated signal,
- a second signal extracting means for extracting a second component signal from the OFDM modulated signal,
- a first DFT means for performing DFT on the extracted first component signal using a first time window signal to generate a first frequency domain component signal,
- a second DFT means for performing DFT on the extracted second component signal using the first time window signal to generate a second frequency domain component signal,
- a clock signal reproduction means having a voltage controlled oscillator,
- a control voltage generating means for generating a control voltage from the outputs of the first and second DFT means corresponding to the synchronization symbol, and
- a time window signal means for generating a time window signal used for selecting a signal in the first and second DFT means from the clock signal reproduced by the clock signal reproduction means.

Preferably, the control voltage generating means oscillator is provided with a Costas computation circuit and a low pass filter for filtering the results of the computation.

More preferably, the time window signal generating means divides the clock signals reproduced by the clock signal reproduction means based on the results of the first and second DFT means corresponding to the synchronization symbol to generate a time window signal used for selection of the signal in the first and second DFT means.

Still more preferably, the first signal extracting means has a first oscillator having a voltage controlled oscillator and a first multiplier for performing frequency conversion by multiplying the received OFDM modulated signal and a first oscillation frequency signal from the first oscillator. The second signal extracting means has a second oscillator having a voltage controlled oscillator for generating a second oscillation frequency signal in an orthogonal relationship with the first oscillation frequency signal and a second multiplier for performing frequency conversion by multiplying the received OFDM modulated signal and the second oscillation frequency signal from the second oscillator. Further provision is made of a control voltage generating means for generating the control voltages of the first and second oscillators from the outputs of the first and second DFT means.

Preferably, the first oscillator and the second oscillator have a common oscillation circuit, and the second oscillator has a circuit for shifting 90° the oscillation frequency from the common oscillation circuit.

Preferably, the first DFT means and the second DFT means are comprised integrally.

Further, according to the present invention, there is provided an OFDM demodulation apparatus for demodulating an OFDM modulated signal which is comprised of a first component signal including a synchronization symbol and a second component signal including a synchronization symbol in an orthogonal relationship with the first component signal, which component signals are multiplexed by orthogonal frequency division, which OFDM demodulation apparatus includes:

- a first signal extracting means for extracting a first component signal from the OFDM modulated signal,
- a second signal extracting means for extracting a second component signal from the OFDM modulated signal,
- a first DFT means for performing DFT on the extracted first component signal using a first time window signal to generate a first frequency domain component signal,
- a second DFT means for performing DFT on the extracted second component signal using the first time window signal to generate a second frequency domain component signal,
- a clock signal reproduction means having a voltage controlled oscillator,
- a first control voltage generating means for generating a control voltage of the clock signal reproduction means from the outputs of the first and second DFT means corresponding to the synchronization symbol.

Preferably, the first control voltage generating means is provided with a Costas computation circuit and a low pass filter for filtering the results of the computation.

Still more preferably, the first signal extracting means has a first oscillator having a voltage controlled oscillator and a first multiplier for performing frequency conversion by multiplying the received OFDM modulated signal and a first oscillation frequency signal from the first oscillator. The second signal extracting means has a second oscillator having a voltage controlled oscillator for generating a second oscillation frequency signal in an orthogonal relationship with the first oscillation frequency signal and a second multiplier for performing frequency conversion by multiplying the received OFDM modulated signal and the second oscillation frequency signal from the second oscillator. Further provision is made of a second control voltage generating means for generating the control voltages of the first and second oscillators from the outputs of the first and second DFT means.

More preferably, the second control voltage generating means is provided with a Costas computation circuit and a low pass filter for filtering the results of the computation.

BRIEF DESCRIPTION OF THE DRAWINGS

The above objects and features of the present invention, along with other objects and features, will be more apparent from the following description made with reference to the appended drawings, in which.

DESCRIPTION OF THE PREFERRED EMBODIMENTS

Figure 1:
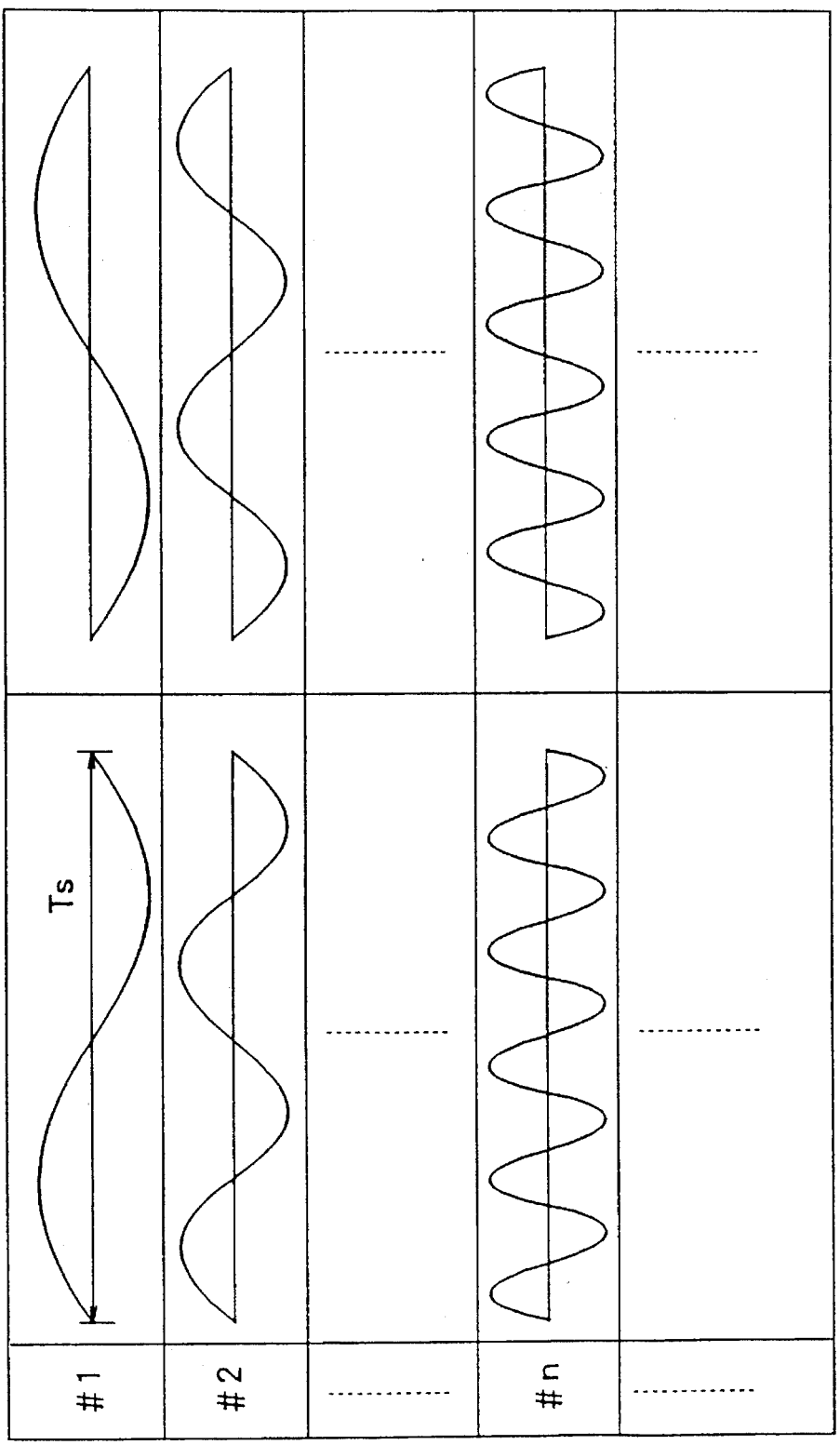
FIG. 1 is a view explaining data transmission by the carrier wave signals of the OFDM format.

Before explaining the preferred embodiments of the OFDM demodulation apparatus of the present invention, an explanation will be given of the basic principle of OFDM modulation in the present invention using numerical equations.

In a 64 QAM or other general multi-level modulation system, a single carrier wave signal is modulated in amplitude or modulated in phase to transmit data in a predetermined band, but the OFDM modulation of the present invention performs transmission of digital data in a predetermined frequency band by modulating a plurality of carrier wave signals by a bit rate lower than the modulation methods using a single carrier wave signal.

If the number of carrier wave signals (number of symbols) of the OFDM modulated signals is made N and QAM modulation is performed on a plurality of carrier wave signals, the m-th symbol $f_m(t)$ of the OFDM signal is expressed by the following equation 1:

$$f_m(t) = S_T(t - nT') \sum_{n=0}^{N-1} a_{mn} \exp(n\omega_0 t + \phi_{mn} + \Delta\phi_{mn}) \quad (1)$$

where, $$S_T = \begin{cases} 1, & \text{when } |t| \leq T'/2 \\ 0, & \text{when } |t| > T'/2 \end{cases}$$

$T' = T + T_g$
$\omega_0 = 2\pi/T$
$T$ is width of time window in Fourier transformation
$T_g$ is guard interval $a_{mn}$ is amplitude of n-th carrier wave signal of m-th symbol $\phi_{mn}$ is phase of n-th carrier wave signal of m-th symbol In equation 1, $\Delta\phi_{m,n}$ is the term for correcting the phase rotation of the symbol by the guard interval, mentioned later, and is expressed by the following equation 2:

$$\phi_{mn} = 2\pi mn T_g/T \quad (2)$$

From equation 1 and equation 2, the OFDM signal is expressed by the following equation 3:

$$f(t) = \sum_{m=-\infty}^{+\infty} f_m(t) \quad (3)$$

$$= \sum_{m=-\infty}^{\infty} \sum_{n=0}^{N-1} a_{mn} \exp j(n\omega_0 t + \phi_{mn} + \Delta\phi_{mn}) \cdot S_T(t - mT')$$

Below, the power spectrum of the OFDM modulated signals will be formularized.

The Fourier integral of the m-th symbol $f_m(t)$ of the time width T' of the m-th symbol expressed by equation 1 is expressed as follows:

$$F_m(\omega) = \int_{(m-1/2)T'}^{(m+1/2)T'} f_m(t) e^{-j\omega t} dt \quad (4)$$

$$= T \sum_{n=0}^{N-1} a_{mn} \frac{\sin T(n\omega_0 - \omega)/2}{T(n\omega_0 - \omega)/2} \cdot$$

$$\exp j[(n\omega_0 - \omega)mT' + \phi_{mn} + \Delta\phi_{mn}]$$

From equation 4, the energy spectrum in the integral duration is expressed by the following equation:

$$|F_m(\omega)|^2 = F_m(\omega) F_m^*(\omega) \quad (5)$$

$$= T^2 \left[ \sum_{n=0}^{N-1} a_{mn}^2 \left\{ \frac{\sin T(n\omega_0 - \omega)/2}{T(n\omega_0 - \omega)/2} \right\}^2 + \sum_{n=0}^{N-1} \sum_{\substack{k \neq m \\ k \neq 0}}^{N-1} a_{mn} a_{mk} \frac{\sin T(n\omega_0 - \omega)/2 \cdot \sin T(k\omega_0 - \omega)/2}{T(n\omega_0 - \omega)/2 \cdot T(k\omega_0 - \omega)/2} \cdot \exp(j(n-k)\omega_0 mT') \right]$$

The content of the second term in equation 5 is as follows:

$$\sum_n \sum_{K \neq m} a_{mn} \exp(jn\omega_0 mT') \cdot a_{mk} \exp(-jk\omega_0 mT') \quad (6)$$

It is a correlation function of the modulation waves of the m-th and k-th carrier wave signals. If it is assumed there is no correlation between data, then the value of equation 6 becomes 0. Accordingly, equation 3 may be modified as shown by the following equation:

$$|F(\omega)|^2 = \sum_{m=-\infty}^{+\infty} \sum_{n=0}^{N-1} a_{mn}^2 \left[ \frac{\sin T(n\omega_0 - \omega)/2}{T(n\omega_0 - \omega)/2} \right]^2 \quad (7)$$

$$= \sum_{m=-\infty}^{+\infty} \sum_{n=0}^{N-1} \left[ \frac{\sin \frac{T+T_g}{2} \left( \frac{2n\pi}{T} - \omega \right)}{\frac{T+T_g}{2} \left( \frac{2mn}{T} - \omega \right)} \right]^2$$

At the receiving side, the received OFDM modulated signal is subjected to DFT to demodulate it. At this time, the OFDM modulated signal is selected by the DFT time window and then DFT processing is performed.

The relationship between the timing of the DFT time window and the demodulated output will be explained next.

For simplification of the explanation, the explanation will be made of the case where m=0 in the above equations, Equation 1 becomes as in the following equation:

$$f_0(t) = S_T(t) \sum_{n=0}^{N-1} a_{0n} \exp(j(n\omega_0 t + \phi_{0n})) \quad (8)$$

The explanation will be made of the case where there is no guard interval, i.e., the case where T=T'.

If the DFT time window is shifted in time (or deviated in phase) by exactly $\tau_0$, there are two symbols of m=0, −1 present in the integral duration [−T/2, t/2]. This Fourier integral $F_0'(\omega)$ is expressed by the following equation:

$$F_0'(\omega) = \int_{-T/2}^{T/2} [f_0(t - \tau_0) + f_{-1}(t - \tau_0)] \cdot \exp(-j\omega t) dt \quad (9)$$

The second term in equation 9 is the interference component leaking from the adjoining symbols due to the deviation of the DFT time window by $\tau_0$.

If the coefficient $F_{OK}'$ with respect to the DFT of (2×N) points is sought from equation 9, the following equation results:

$$F_{Ok}' = (1 - \tau_0/T)\exp(-j2\pi\tau_0/T) \cdot \quad (10)$$

$$\left[ a_{0k}\exp(j\phi_{0k}) + \sum_{n \neq k} a_{0n} \frac{\sin(n-k)(1-\tau_0/T)\pi}{(n-k)(1-\tau_0/T)\pi} \exp j \right.$$

$$\{\phi_{0n} - (n-k)\pi\tau_0/T\} +$$

$$\frac{\tau_0}{T - \tau_0} \sum_{n=0}^{N-1} a_{-1n} \frac{\sin(n\omega_0 - \omega)\tau_0/2}{(n\omega_0 - \omega)\tau_0/2} \cdot$$

$$\left. \exp j\{\phi_{-1n} - (n\omega_0 - \omega)(T + \tau_0)/2\} \right]$$

The first term in the parentheses in equation 10 shows the signal component, the second term the leakage signal component from the other carrier wave signals, and the third term the leakage signal component from the adjoining symbols. Further, the coefficient shows the overall changes in amplitude and phase.

The ratio of the interference power $I_k$ due to the leakage signal component with respect to the signal power $S_k$ in the k-th carrier wave signal is expressed by the following equation:

$$S_K/I_k = 1 / \left[ \sum_{n \neq k} \left\{ \frac{\sin(n-k)(1-\tau_0/T)\pi}{(n-k)(1-\tau_0/T)\pi} \right\}^2 + \right. \quad (11)$$

$$\left. \left( \frac{\tau_0}{T - \tau_0} \right)^2 \sum_{n=0}^{N-1} \left\{ \frac{\sin(n-k)\pi\tau_0/T}{(n-k)\pi\tau_0/T} \right\}^2 \right]$$

An explanation will be made of the case of presence of a guard interval.

The Fourier integral $F_0''(\omega)$ in the case of a small phase deviation $\tau_0$ of the DFT time window and an integral duration in the same symbol ($\tau_0 \leq T_g/2$) is expressed by the following equation:

$$F_0''(\omega) = \int_{-T/2}^{T/2} f_0(t - \tau_0)\exp(-j\omega t)dt \quad (12)$$

$$= T \sum_{n=0}^{N-1} a_{0n} \frac{\sin(n\omega_0 - \omega)T/2}{(n\omega_0 - \omega)T/2} \exp(j(\phi_{0n} - n\omega_0\tau_0))$$

If the DFT coefficient $F_{Ok}''$ is sought from equation 12, the following equation is obtained:

$$F_{Ok}'' = a_{0k} \exp(j(\phi_{0k} - k\omega_0\tau_0)) \quad (13)$$

There is only a signal component in equation 13. Accordingly, it is learned from equation 13 that the signal phase is rotated by the carrier wave signal.

Next, an explanation will be made of the case where the phase deviation $\tau_0$ of the DFT time window is larger and the integral duration involves the adjoining symbols.

In this case, the result becomes similar to the model of the case with no guard interval, so the Fourier integral, DFT, and ratio $S_k/I_k$ of the interference power $I_k$ to the signal power $S_k$ become the same as in equations 9 to 11, respectively.

An explanation will now be made of the case of allocation of the null signal as the guard interval.

If the null signal duration of the guard interval is sufficiently long compared with the deviation $\tau_0$ of the time window, the Fourier integral $F_0'''(\omega)$ is expressed by the following equation:

$$F_0'''(\omega) = \int_{-T/2}^{T/2} f_0(t - \tau_0)\exp(-j\omega t)dt \quad (14)$$

$$= (T - \tau_0)\exp(-j\omega\tau_0/2) \cdot \sum_{n=0}^{N-1} a_{0n} \frac{\sin(n\omega_0 - \omega)(T - \tau_0)/2}{(n\omega_0 - \omega)(T - \tau_0)/2} \exp(j(\phi_m - m\omega_0\tau_0/2))$$

Equation 14 becomes just the first term of equation 8. The reason is that the time deviation $\tau_0$ of the DFT time window becomes the integral of the null signal duration, so becomes 0 and because there is no longer leakage of the signal component from the adjoining symbols caused in the case of no guard interval.

If the coefficient $F_{Ok}''$ in the case of performing DFT on 2N points is sought from equation 14, the following equation results:

$$F_{Ok}'''(\omega) = (1 - \tau_0/T)\exp(-j2\pi k\tau_0/T)[a_{0k}\exp(j\phi_0 k) + \quad (15)$$

$$\sum_{n \neq k} a_{0n} \frac{\sin(n-k)(1-\tau_0/T)\pi}{(n-k)(1-\tau_0/T)\pi} \cdot \exp[j\{\phi_{0n} - (n-k)\pi\tau_0/T\}]$$

The first term in the parentheses in equation 15 is the signal component, while the second term shows the leakage signal component from the other carrier wave signals. The signal power to interference power ratio $S_k/I_k$ is expressed by the following equation:

$$S_k/I_k = 1/\sum_{n \neq k} \left[ \frac{\sin(n-k)(1-\tau_0/T)\pi}{(n-k)(1-\tau_0/T)\pi} \right]^2 \quad (16)$$

An explanation will be made next of the effect of ghosts caused by multiple path interference etc.

A signal as the ghost $g_0(t)$ is assumed that the main signal expressed by the following equation is delayed by the deviation $\tau_0$ of the time window is $\alpha_0$ and a phase thereof is rotated by exactly $\theta_0$.

$$g_0(t) = \alpha_0 f_0(t-\tau_0) \exp(j\theta_0) \quad (17)$$

In equation 17, the component of $\exp(j\theta_0)$ is assumed because of consideration of the leakage of the I axis and Q axis, that is, the orthogonal ghost.

Further, the main signal $F_{0k}$ is expressed by the following equation:

$$F_{0k} = \alpha_{0k} \exp(j\phi_{0k}) \quad (18)$$

When allocating a null signal as the guard interval, the DFT coefficient $G_{0k}$ of the ghost component is expressed by the following equation referring to equation 15:

$$G_{0k} = \alpha_0(1 - \tau_0/T)\exp(j(\theta_0 - 2\pi k\tau_0/T)) \quad (19)$$

$$[a_{0k}\exp(j\phi_{0k}) + \sum_{n \neq k} a_{0k}\frac{\sin(n-k)(1-\tau_0/T)\pi}{(n-k)(1-\tau_0/T)\pi}$$

$$\exp(j(\phi_{0k} - (n-k)\pi\tau_0/T)]$$

Accordingly, the DFT coefficient $H_{0k}$ of the received signal comprised of the main signal plus the ghost is expressed by the following equation:

$$H_{0k} = F_{0k} + G_{0k} \quad (20)$$

$$= \{1 + 2\alpha_0(1-\tau_0/T)\cos(\theta_0 - 2\pi k\tau_0/T) +$$

$$\alpha_0^2(1-\tau_0/T)^2\}^{1/2}\exp(j\theta)a_{0k}\exp(j\phi_{0k}) +$$

$$\alpha_0(1-\tau_0/T)\exp(j(\theta_0 - \pi k\tau_0/T))$$

$$\sum_{n \neq k} a_{0k}\frac{\sin(\theta_0 - 2\pi k\tau_0/T)\pi}{(n-k)(1-\tau_0/T)\pi} \exp(j(\phi_{0n} - n\pi\tau_0/T))$$

In equation 20, the first term is the signal component and the second term is the leakage signal component from the other carrier wave signals. Accordingly, the ratio of the signal power to the interference power $S_k/I_k$ is expressed by the following equation:

$$S_k/I_k = [1 + 2\alpha_0(1-\tau_0/T)\cos(\theta_0 - 2\pi k\tau_0/T) + \quad (21)$$

$$\alpha_0^2(1-\tau_0/T)^2]/$$

$$\left[ \alpha_0^2(1-\tau_0/T)^2 \sum_{n \neq k} \left( \frac{\sin(n-k)(1-\tau_0/T)\pi}{(n-k)(1-\tau_0/T)\pi} \right) \right]^2$$

From equation 21, the signal power to interference power ratio $S_k/I_k$ is expressed by the following equations:

$$(S_k/I_k)_{max} = \left[ \frac{1 + \alpha_0(1-\tau_0/T)}{\alpha_0(1-\tau_0/T)} \right]^2 / \quad (22)$$

$$\sum_{m \neq k} \left[ \frac{\sin(n-k)(1-\tau_0/T)\pi}{(n-k)(1-\tau_0/T)\pi} \right]^2$$

$$(S_k/I_k)_{min} = \left[ \frac{1 - \alpha_0(1-\tau_0/T)}{\alpha_0(1-\tau_0/T)} \right]^2 / \quad (23)$$

$$\sum_{m \neq k} \left[ \frac{\sin(n-k)(1-\tau_0/T)\pi}{(n-k)(1-\tau_0/T)\pi} \right]^2$$

Equations 20 to 23 are computed assuming that the DFT time window coincides with the main signal. If the DFT time window is deviated, the signal power to interference power ratio $S_k/I_k$ further falls.

An explanation will be made of the OFDM referring to FIG. 1. FIG. 1 is a view for explaining data transmission by the carrier wave signals of the OFDM.

The signals shown by the symbols #k (k is a whole integer) show the waveforms of the carrier wave signals of a period $T_s/k$ in the respective time intervals (symbol intervals) $T_s$. The waveform shown in (a) of FIG. 1 and the waveform shown in (b) of FIG. 1 show the carrier wave signal waveforms in the case of the values of the digital data 1 and 0 to be transmitted.

A predetermined certain time interval $T_s$ is used as the symbol duration.

The #1 to #n in FIG. 1 show the cases of the carrier wave signals #1 to #n of periods of $T_s$ to $T_s/n$. These carrier wave signals #1 to #n are arranged in order. If the amplitudes and the phases of these carrier wave signals are defined by the data to be transmitted, then it is possible to define the waveforms of the symbols by the digital data to be transmitted.

The carrier wave signal waveform shown in (a) of FIG. 1 and the carrier wave signal waveform shown in (b) of FIG. 1 are defined. The transmitter in which the OFDM modulation apparatus is provided assigns the signals of the waveform shown in (a) of FIG. 1 the logical value 1 and assigns the signals of the waveform shown in (b) of FIG. 1 the logical value 0 and therefore can transmit digital data for each carrier wave signal.

In the examples shown in (a) of FIG. 1 and (b) of FIG. 1, the carrier wave signals are modulated by BPSK defined in two phase states and 1 bit of digital data is transmitted for each carrier wave signal, but it is also possible to define more phases and amplitudes for each carrier wave signal and transmit more values. That is, those waveforms are obtained by defining the amplitudes and phases of the carrier wave signals.

The processing operation for obtaining the waveforms generally becomes the inverse Fourier transformation (IFT) processing or, in the case of handling digital data, the IDFT processing, so in an OFDM modulation apparatus, it is possible to obtain an OFDM modulated signal using the IDFT circuit. Further, in an OFDM demodulation apparatus, for digital data, it is possible to demodulate an OFDM modulated signal using a discrete Fourier transformation (DFT) circuit.

First Embodiment: OFDM Modulation Apparatus (OFDM Transmitter).

Figure 2:
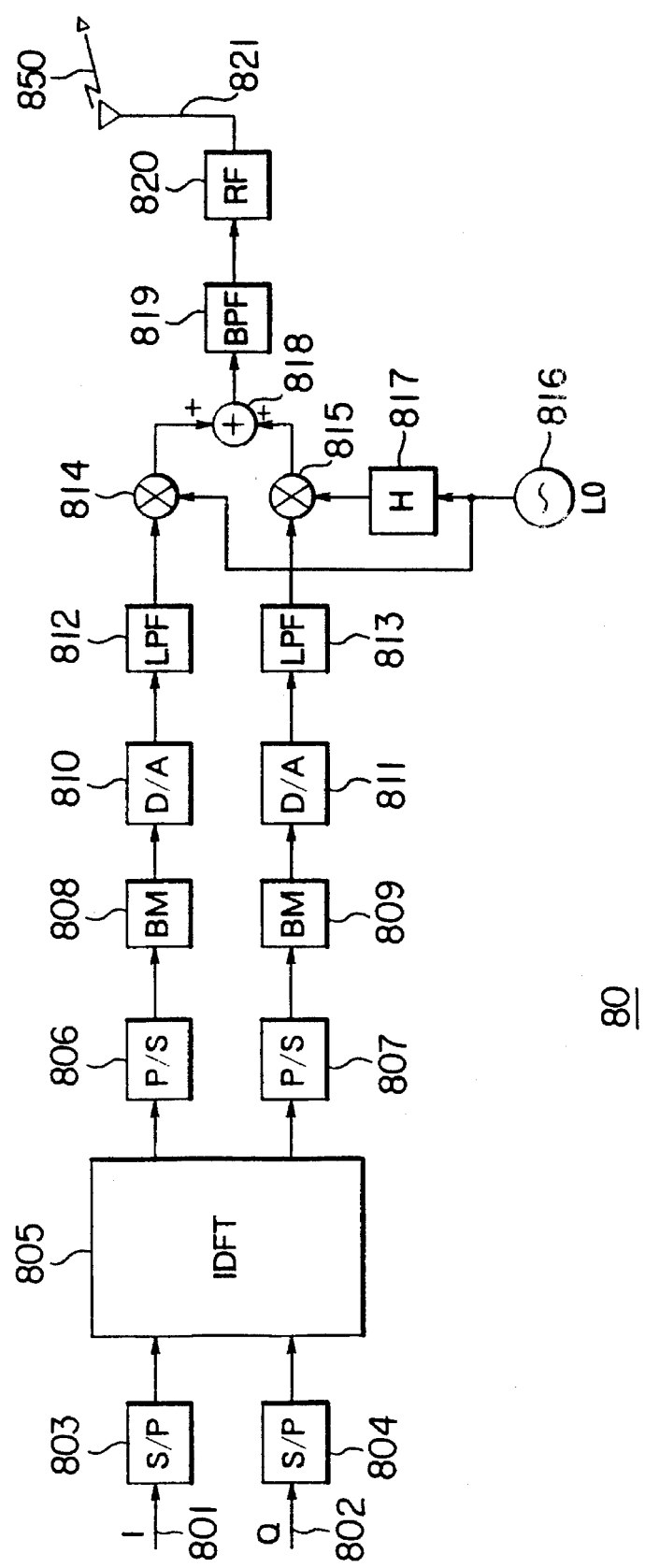
FIG. 2 is a view of the configuration of an OFDM modulation apparatus according to a first embodiment of the present invention.

FIG. 2 is a view of the configuration of an OFDM modulation apparatus 80 of an embodiment of the present invention.

The OFDM modulation apparatus 80 is comprised of S/P converters 803 and 804, an IDFT circuit 805, P/S converters 806 and 807, buffer memories 808 and 809, D/A converters 810 and 811, low pass filters 812 and 813, multipliers (frequency convertors) 814 and 815, a local oscillator 816, a 90° phase shifter 817, an adder 818, a bandpass filter 819, and an RF converter 820.

The I channel signals 801 and 812 and the Q channel signals 801 and 812, which are in an orthogonal relationship, are respectively input into the S/P converters 803 and 804. Note that the I channel signals and the Q channels signals have each added to them synchronization symbols used for generation of the DFT time window signals required for the DFT processing in the later mentioned OFDM demodulation apparatus and for synchronization.

The S/P converters 803 and 804 perform serial/parallel conversion on the input digital format I channel signals and Q channel signals to produce parallel data which are then output to the IDFT circuit 805.

The IDFT circuit 805 performs IDFT processing on the orthogonal relationship I channel signals and Q channel signals applied from the S/P converters 803 and 804 to convert the input signals from the frequency domains to the time domains and outputs the results to the P/S converters 806 and 807.

The IDFT computation in the IDFT circuit 805 is expressed by the following equation:

$$X(k) = \sum_{n=0}^{N-1} x(n)\exp(-j(2\pi kn/N)) \quad (24)$$

where,

X(k) is output data of DFT circuit x(n) is input data to DFT circuit.

Figure 3:
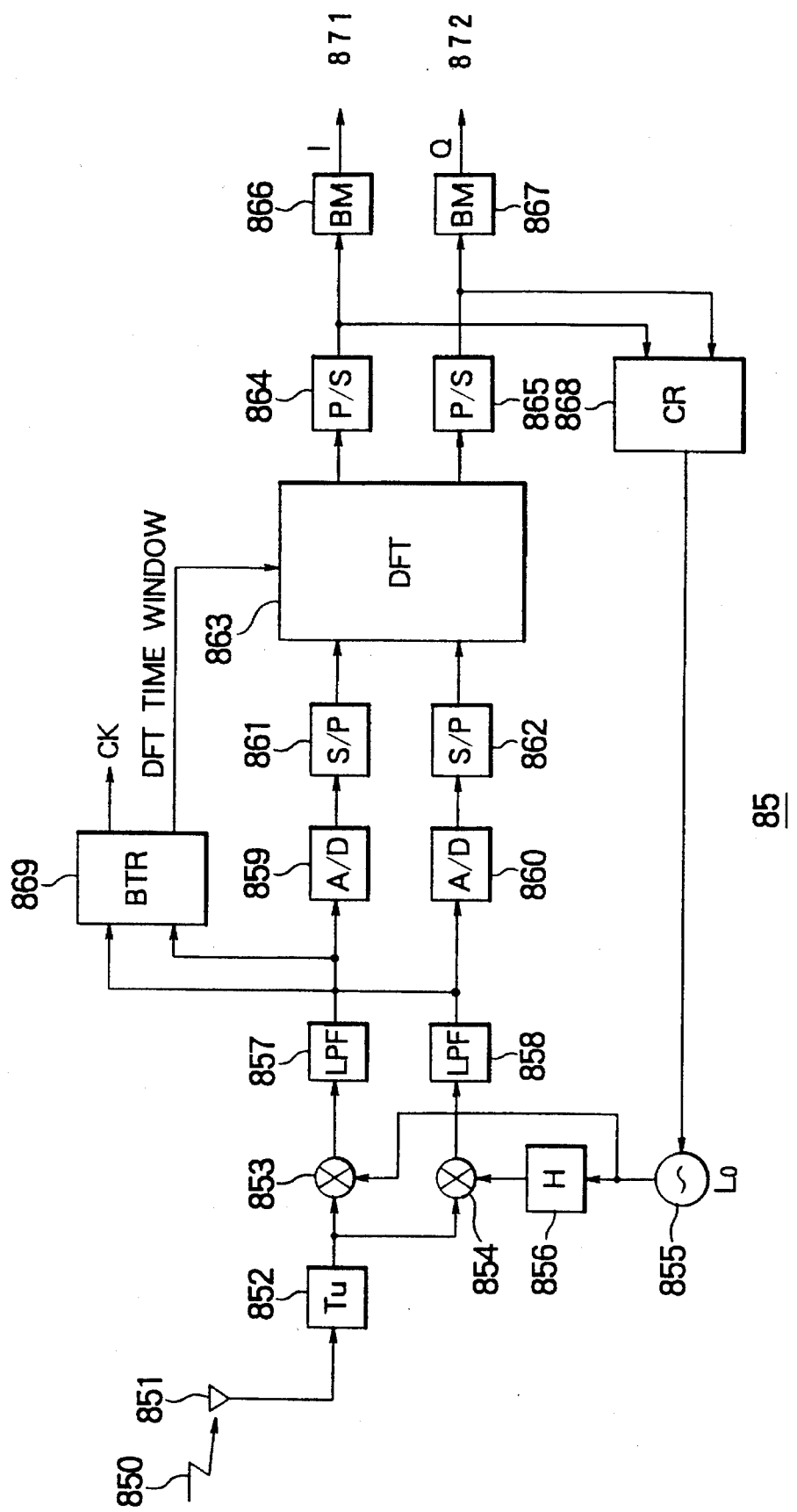
FIG. 3 is a view of the configuration of an OFDM demodulation apparatus according to a second embodiment of the present invention.

At this time, the IDFT circuit 805 performs IDFT processing so that the IDFT coefficient of a predetermined frequency component arranged with the OFDM demodulation apparatus 85 shown in FIG. 3 in advance becomes 0.

The IDFT circuit 805 performs IDFT processing on the parallel format frequency domain I channel signals and Q channel signals to convert them to time domain signals. In the IDFT circuit 805, computation is performed so that the above-mentioned frequency component becomes 0. That is, the IDFT circuit 805 makes the IDFT coefficient corresponding to a predetermined carrier wave signal in the IDFT processing results a fixed value, for example, 0, makes the amplitude of the carrier wave signal of the OFDM modulated signal obtained as a result of the IDFT processing 0, or generates time domain I channel signals and Q channel signals so that the amplitude of the carrier wave signal of the OFDM modulated signal becomes 0.

The P/S converters 806 and 807 convert the parallel format output signals (coefficients) of the IDFT circuit 805 to serial format signals and apply the same to the buffer memories 808 and 809. The buffer memories 808 and 809 perform processing such as adding guard intervals to the signals input from the P/S converters 806 and 807 and outputs the same to the D/A converters 810 and 811. The D/A converters 810 and 811 convert the digital signals applied from the buffer memories 806 and 809 to analog signals and apply the results to the low pass filters 812 and 813. The low pass filters 812 and 813 perform filtering on the signals from the D/A converters 810 and 811 to remove the return signal components and output the results to the multipliers 814 and 815.

The local oscillator 816 generates a carrier wave signal having the local oscillation frequency and outputs the same to the multiplier 814 and the 90° phase shifter 315. The 90° phase shifter 817 shifts by 90° the carrier wave signal input from the local oscillator 816 and outputs the result to the multiplier 815.

The multipliers 814 and 815 respectively multiply the local oscillation signal input from the local oscillator 816, that is, the carrier wave signal, and the carrier wave signal comprised of this carrier wave signal shifted 90° in phase by the 90° phase shifter 817 and the output signals from the low pass filters 812 and 813 from which the return signal components have been removed, convert the input signals in frequency to signals of an intermediate frequency band, and output the results to the adder 818.

The carrier wave signals modulated by the multipliers 814 and 815 by the output signals from the low pass filters 812 and 813 are combined by the adder 818.

The bandpass filter 819 restricts the combined output signal of the adder 818 to a predetermined frequency band width and outputs the result to the RF converter 820.

The RF converter 820 converts the signal restricted in band in the bandpass filter 819 to the transmission frequency and sends it out over the air as the transmission signal from the transmission antenna 821.

In the above way, the OFDM modulated signal modulated by the OFDM modulation apparatus 80 is sent to the OFDM receiver 851 shown in FIG. 80.

In this way, the OFDM modulation apparatus 3 sends out an OFDM modulated signal which can be subjected to signal processing more accurately to demodulate the OFDM modulated signal in the OFDM receiver 851, more specifically, the later mentioned OFDM demodulation apparatus 85.

Second Embodiment: OFDM Demodulation Apparatus

An explanation will now be given of the configuration and operation of an OFDM demodulation apparatus for receiving and demodulating a OFDM modulated signal.

FIG. 3 is a view of the configuration of the OFDM demodulation apparatus 85.

The OFDM demodulation apparatus 85 is comprised of a receiving antenna 851 for receiving a radio frequency (RF) signal 850, a tuner 852, multipliers (frequency convertors) 853 and 854, a local oscillator 855, a 90° phase shifter (or hybrid circuit) 856, low pass filters 857 and 858, A/D converters 859 and 860, S/P conversion circuits 861 and 862, a DFT circuit 863, P/S converters 864 and 865, buffer memories 866 and 867, a carrier wave signal reproduction circuit 868, and a BTR (BTR) circuit (or clock reproduction circuit) 869 for generating a reproduction clock signal.

Figure 4:
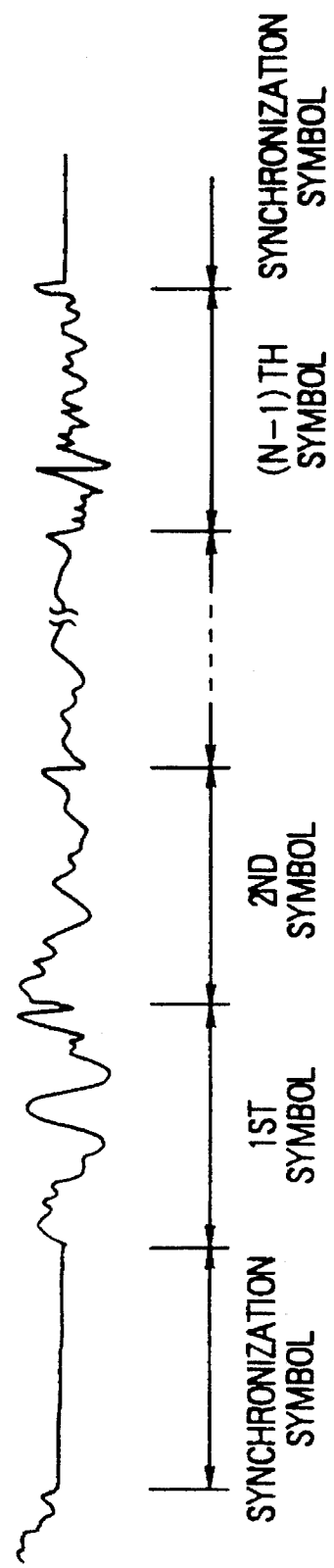
FIG. 4 is a view of the frame configuration of an OFDM modulated signal.

FIG. 4 is a graph showing the format of an OFDM modulated signal.

The RF input signal 850 input to the receiving antenna 851 is an OFDM modulated signal. In the RF input signal 850 is inserted a synchronization symbol by the apparatus shown in FIG. 2.

The synchronization symbol is inserted at a predetermined position in the format of the OFDM modulated signal, for example, at the header of the format. To distinguish it from other valid symbols, it is a symbol comprised of a "null signal" of no signal meaning. This synchronization symbol is used for frame synchronization in the stage of OFDM demodulation and for reproduction of the clock signals.

The synchronization symbol can be easily inserted by making a fixed value the portion corresponding to the synchronization symbol in the original input signal of the transmission apparatus, for example, in the case of a binary signal, the I-phase (I) channel signal and the quadrature (Q) channel signal.

As a result of demodulation of the RF signal 850 in the OFDM demodulation apparatus 85, the digital I channel signal 871 and Q channel signal 872 are output from the buffer memories 866 and 867. Preferably, the buffer memories 866 and 867 remove the guard intervals from the I channel signal 871 and the Q channel signal 872.

An explanation will next be made of the operation of the OFDM demodulation apparatus 85.

The RF signal input 850 having the synchronization symbol inserted in it is captured by the receiving antenna 851 and applied to the tuner 852.

The tuner 852 converts the received RF input signal 85 in frequency to an intermediate frequency band (IF) signal, amplifies it, and applies it to the multipliers (frequency converters) 853 and 854.

The respective multipliers 853 and 854 receive as input a local oscillation frequency signal of the local oscillator 855 and a 90° phase shifted local oscillation frequency signal obtained by shifting the output signal of the local oscillator 855 90° in phase by the 90° phase shifter 856. These frequency signals and the output signal of the tuner 852 are multiplied, the IF signal output from the tuner 852 is converted in frequency to a base band signal, and the I channel base band signal and Q channel base band signal with a 90° phase difference (orthogonal relationship) are separated.

These two base band signals with the 90° phase difference, that is, the I channel base band signal and the Q channel base band signal, are cleared of their high frequency components by the low pass filters 857 and 858 and applied to the A/D converters 859 and 860.

The low frequency base band signals output from the low pass filters 857 and 858 are converted to digital signals in the A/D converters 859 and 860 and are further converted to parallel signals by the S/P converters 861 and 862 and then are applied to the DFT circuit 863.

The two signals converted to digital parallel signals are selected in the DFT circuit 863 based on the DFT time window signal applied from the BTR circuit 869 and DFT processing is performed on the selected portions.

The DFT time window signal is, as mentioned later, produced by dividing to 1/M the clock signal reproduced in the BTR circuit 869.

The results of the DFT processing on the two orthogonally related I and Q signals in the DFT circuit 863 are converted to serial signals in the P/S converters 864 and 865 and output to the buffer memories 866 and 867 and the carrier wave signal reproduction circuit 868.

The carrier wave signal reproduction circuit 868 reproduces the carrier wave signals based on the two input DFT signals and using these reproduced carrier wave signals controls the local oscillator 855 to make local oscillation signals be generated from the local oscillator 855. More specifically, the carrier wave signal reproduction circuit 868 has a Costas loop circuit. The local oscillator 855 generates the carrier wave signals using the signals from the Costas loop circuit.

The BTR circuit 869 generates a clock signal CK defining the timing of the processing in the DFT circuit 863 etc. based on the low frequency base band signals output from the low pass filters 857 and 858 and generates the DFT time window signal to the DFT circuit 863.

The two orthogonal signals converted to serial signals in the P/S converters 864 and 865 are processed to remove the guard intervals added at the time of the OFDM modulation and are output from the buffer memories 866 and 867 as the digital format I channel signal 871 and Q channel signal 872 with a phase difference of 90° (orthogonal).

To correctly demodulate the OFDM modulated signal received at the receiving side, it is necessary to correctly reproduce the carrier wave signals and clock signal and to correctly generate the DFT time window timing (phase) used in the DFT processing.

To enable correct generation of the DFT time window at the receiving side, the transmission is performed with the insertion of a null signal synchronization symbol at the header of the frame of the OFDM modulated signal. This synchronization symbol is detected at the receiving side, synchronization is performed by the Costas loop circuit or other phase locked loop (PLL) circuit in the carrier wave signal reproduction circuit 868, and the symbol clock is reproduced or use is made of the same as a reference signal for synchronization of the DFT time window.

Below, an explanation will be made of the configuration of the frame of the OFDM modulated signal and the configuration and operation of the BTR circuit 869 referring to FIG. 4 and FIG. 5.

In this example, as shown in FIG. 4, the synchronization symbol is placed before the first symbol in the frame configuration of the OFDM modulated signal.

Figure 5:
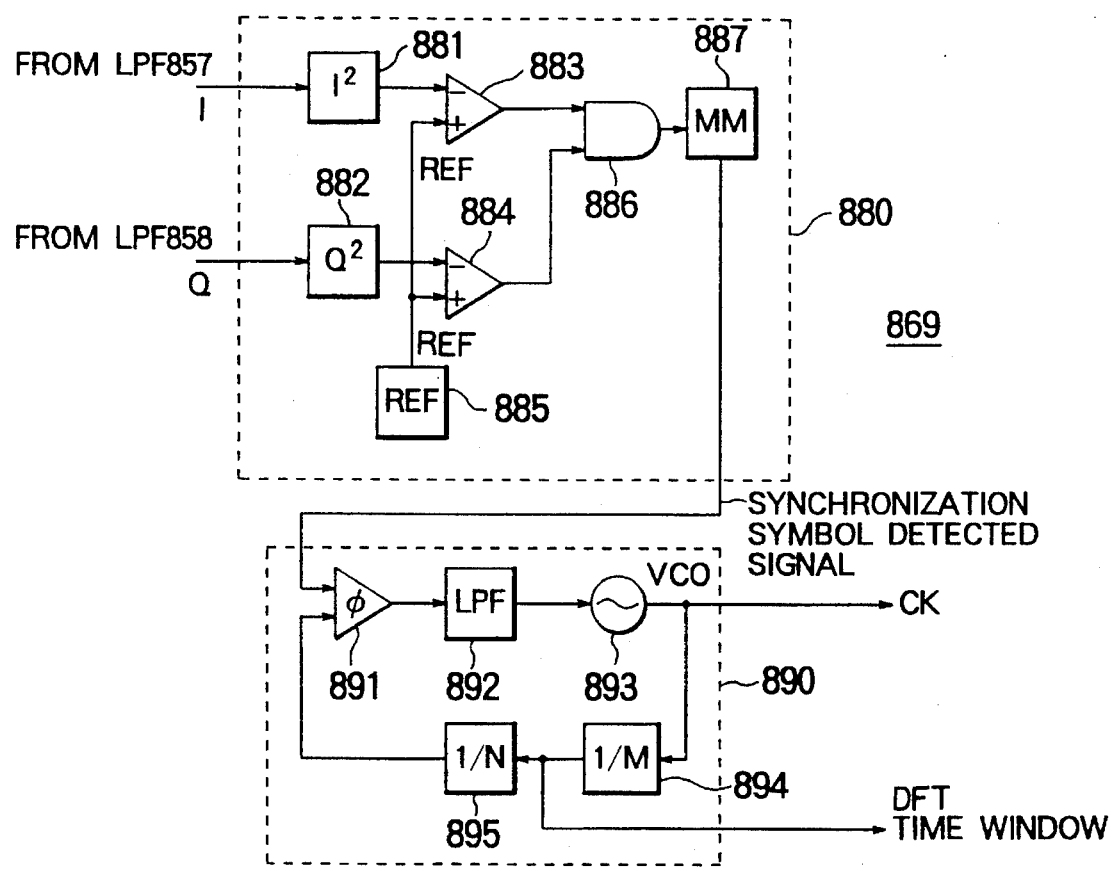
FIG. 5 is a view of the configuration of the clock reproduction circuit shown in FIG. 3.

The BTR circuit 869 shown in FIG. 5 is comprised of a synchronization symbol detection circuit 880 and a PLL circuit 890. The synchronization symbol detection circuit 880 detects the synchronization symbol shown in FIG. 4 from the low frequency base band signals output from the low pass filters 857 and 858 shown in FIG. 3. The PLL circuit 890 generates the clock signal CK and the DFT time window signal based on the synchronization symbol detection signal detected by the synchronization symbol detection circuit 880.

The synchronization symbol detection circuit 880 is comprised of doublers 881 and 882, amplitude comparators 883 and 884, a reference value output circuit 885, an AND circuit 886, and a pulse cancel circuit 887 having a mono-multi vibrator.

The output signals of the low pass filters 857 and 858 are applied to the doublers 881 and 882 of the synchronization symbol detection circuit 880. The square values of the amplitude voltages of the input signals, that is, the instantaneous energies of the I and Q signals, are calculated at the doublers 881 and 882 and these instantaneous energies are applied to the amplitude comparison circuits 883 and 884.

In the amplitude comparison circuits 883 and 884, these square values are compared with the reference value REF output from the reference value output circuit 885. When a square value is lower than the reference value REF, it is considered that the synchronization symbol is detected and the logical value 1 is output. That is, in the period of existence of the synchronization symbol, the output signals of the low pass filters 857 and 858 become the null signal (0V), so the logical value 1 is output from both the amplitude comparators 883 and 884.

The logical AND of the output signals of the amplitude comparison circuits 883 and 884 is taken at the AND circuit 886. When the synchronization symbol is detected, the output signal of the AND circuit 886 becomes the logical value 1. The result of the AND operation is applied to the pulse cancel circuit 887.

Even in the period of data from the first symbol to the (N−1)th symbol shown in FIG. 4, there are sometimes cases due to the effects of noise, the effects of multiple path interference, etc. where the output value of the AND circuit 886 becomes the logical value 1 for an instant as if the synchronization symbol were present.

The pulse cancel circuit 887 accurately detects the synchronization symbol by canceling the pulses generated when the output signal of the AND circuit 886 becomes the logical value 1 for an instant at periods other than that of the synchronization symbol and outputs the result to the PLL circuit 890 as the synchronization symbol detection signal. The pulse cancel circuit 887 is comprised of a circuit comprised of a combination of a low pass filter and a waveshaping circuit for example.

The PLL circuit 890 is comprised of a phase comparator 891, a low pass filter 892, a voltage controlled oscillator (VCO) 893, a 1/M frequency divider 894, and a 1/N frequency divider 895.

The VCO 893 generates a clock signal CK, the 1/M frequency divider divides the clock signal CK to 1/M to generate the time window signal, and the 1/N frequency divider 895 generates a timing pulse for detecting the synchronization symbol. Details of this operation are explained below.

The synchronization symbol detection signal output from the synchronization symbol detection circuit 880 is input to the phase comparator 891, where it is compared in phase with the signal output from the 1/N frequency divider 895. The phase error output from the phase comparator 891 is filtered by the low pass filter 892 and applied to the VCO 893. The VCO 893 generates a clock signal CK of a frequency corresponding to the output signal voltage of the low pass filter 892. The clock signal CK is divided in frequency to the 1/M frequency by the 1/M frequency divider 894 and is output as the DFT time window signal to the DFT circuit 863 and further is divided to the 1/N frequency at the 1/N frequency divider 895 and input to the phase comparator 891.

The N defining the 1/N frequency division ratio of the 1/N frequency divide 895 matches with the number N of symbols, including the synchronization symbol, in the frame of the OFDM modulated signal shown in FIG. 4. When the frame configuration is changed, the frequency division ratio of the 1/N frequency divider 895 is changed along with it.

When the above-mentioned OFDM modulated signal is transmitted in the format of a radio wave signal, there is the possibility of multiple path interference or large noise or other external disturbances for example in the transmission path.

In a transmission path suffering from such external disturbances, the components of the symbols adjoining the synchronization symbol leak into the period of the synchronization symbol or noise ends up entering into the synchronization symbol period, so it is sometimes difficult at the receiving side to accurately detect the synchronization symbol included in the RF input signal 850.

Further, since it is not possible to transmit effective data in the period of the synchronization symbol, the request has been made, from the standpoint of the efficiency of the data transmission, that the synchronization symbol be made as small as possible.

Conversely, however, there is the problem that reduction of the period of the synchronization symbol is not desired from the standpoint of the stability of the PLL circuit 890 defining the timing of operation of the OFDM demodulation apparatus on the receiving side since the signal required for synchronization at the PLL circuit 890 becomes shorter.

Third Embodiment: OFDM Demodulation Apparatus

An explanation will now be given of an OFDM demodulation apparatus according to a third embodiment of the present invention referring to FIG. 6.

The third embodiment solves the above problems. The OFDM demodulation apparatus 11 of the third embodiment shown in FIG. 6 is an improvement over the OFDM demodulation apparatus 85 shown in FIG. 3.

Figure 6:
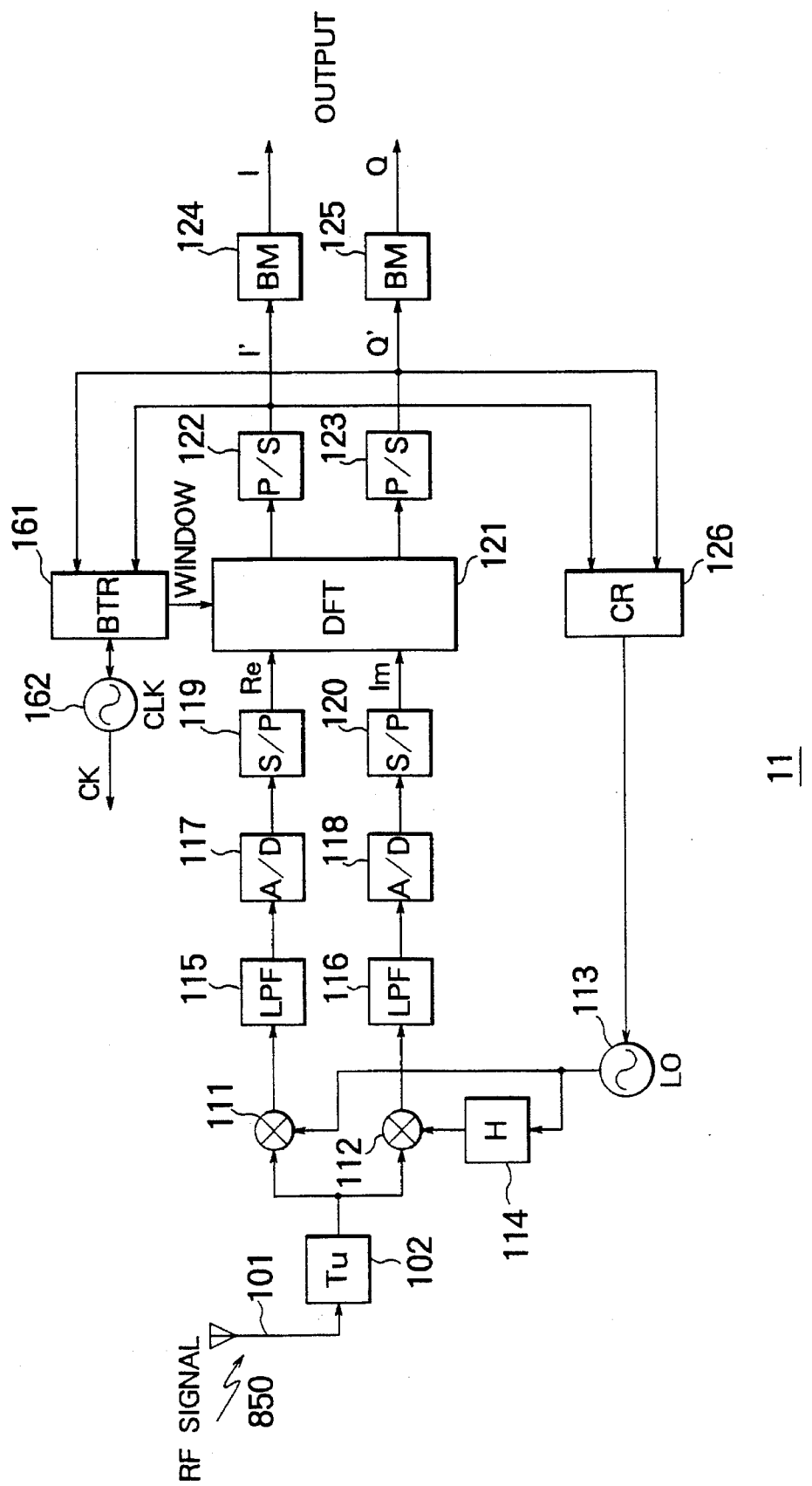
FIG. 6 is a view of the configuration of the OFDM demodulation apparatus according to a third embodiment of the present invention.

The difference in configuration between the OFDM demodulation apparatus 85 of the second embodiment shown in FIG. 3 and the OFDM demodulation apparatus 11 of the third embodiment is that, in FIG. 6, as the input signal of the BTR circuit (clock reproduction circuit) 161, use is made of the transformation output of the DFT circuit 121 through the P/S converters 122 and 123.

The references differ, but the rest of the configuration of the OFDM demodulation apparatus 85 is the same as the configuration of the OFDM demodulation apparatus 11.

The operation of the OFDM demodulation apparatus 11 will now be summarized.

The receiving antenna 101 receives for example an OFDM modulated signal including a synchronization symbol sent out from the OFDM modulation apparatus 80 shown in FIG. 2. The tuner 102 converts the received RF signal to an IF signal and if necessary amplifies it.

The multipliers (frequency converters) 111 and 112 separate the IF signal into an I channel signal and Q channel signal and convert them in frequency to the base band frequency. For this, the multiplier 111 is given the carrier wave from the local oscillator 113, while the multiplier 112 is given a carrier wave comprised of the carrier wave of the local oscillator 113 shifted 90° by the 90° phase shifter 114.

The low pass filters 115 and 116 pass the low frequency components of the I and Q channel signals of the base band from the multipliers (frequency converters) 111 and 112. The results are converted to digital values by the A/D converters 117 and 118 and then converted to a parallel format by the S/P converters 119 and 120 and applied to the DFT circuit 121.

The DFT circuit 121 uses the DFT time window from the BTR circuit 161 to select input signals and performs DFT based on equation 24 to transform them to a spatial domain.

The results of the DFT are converted to serial data by the P/S converters 122 and 123, are processed to remove the guard intervals etc. at the buffer memories 124 and 125, and are output as the demodulated I channel signal and Q channel signal.

The results of the DFT circuit 121 are applied through the P/S converters 122 and 123 to the carrier wave signal reproduction circuit 126 having a Costas loop circuit for example. The carrier wave signal reproduction circuit 126 produces a signal for controlling the local oscillator 113 having the VCO.

The clock signal generating circuit 162 like the local oscillator 113 includes for example a VCO and generates a clock signal CK of a frequency corresponding to the control voltage signal input from the clock signal reproduction circuit 161.

The BTR circuit 161 produces a control voltage signal for controlling the clock signal generating circuit 162 based on output signals of the DFT circuit 121 applied through the P/S converters 122 and 123 and produces a DFT time window signal.

Figure 7:
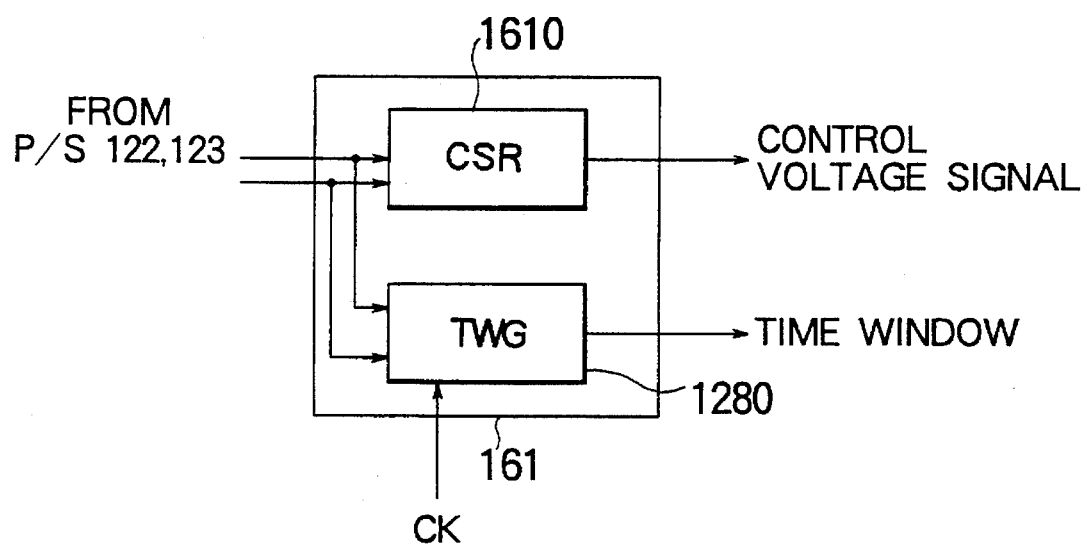
FIG. 7 is a view of the configuration of the clock signal generating circuit shown in FIG. 6.

FIG. 7 is a view of the configuration of the BTR circuit 161.

The BTR circuit 161 is comprised of the clock reproduction circuit 1610 and the time window signal generating circuit 1280.

The clock reproduction circuit 1610 produces a control voltage signal for controlling the clock signal generating circuit 162 based on the I' channel signal and the Q' channel signal input from the P/S converters 122 and 123.

The time window signal generating circuit 1280 produces a time window signal based on the signal I' and signal Q' input from the P/S converters 122 and 123 and the clock signal CK.

Figure 8:
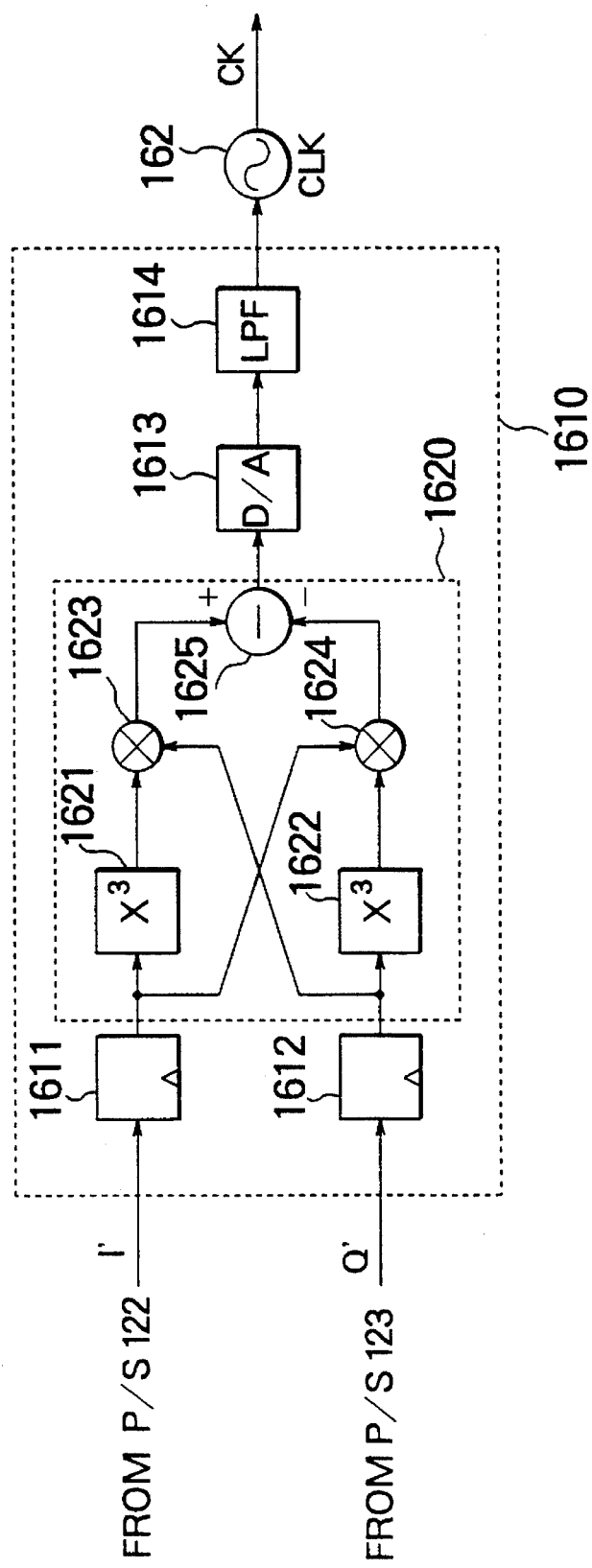
FIG. 8 is a view of the configuration of the clock reproduction circuit shown in FIG. 7.

FIG. 8 is a view of the configuration of the clock reproduction circuit 1610 shown in FIG. 7.

The clock reproduction circuit 1610 is comprised of the registers 1611 and 1612, the Costas computation circuit 1620, the D/A converter 1613, and the low pass filter 1614.

The Costas computation circuit 1620 is comprised of the cubing circuits 1621 and 1622, the multipliers (frequency converters) 1623 and 1624, and the subtractor 1625.

The registers 1611 and 1612 latch only the signals corresponding to the specific carrier wave signal of a single wave for each symbol out of the signal I' and signal Q' input from the P/S converters 122 and 123 and output the same to the cubing circuits 1621 and 1622 and the multipliers 1623 and 1624.

The cubing circuits 1621 and 1622 cube the input signal I' and signal Q' and input the same to the multipliers 1623 and 1624.

The multipliers 1623 and 1624 multiply the cubes of the signal I' and signal Q' output from the cubing circuits 1621 and 1622 and the Q' signal and I' signal.

The subtractor 1625 subtracts the result of multiplication output from the multiplier 1624 from the result of multiplication output from the multiplier 1623 to detect the phase difference and output the same to the D/A converter 1613.

The D/A converter 1613 converts the phase difference of the signal I' and signal Q' calculated at the Costas computation circuit 1620 in this way into an analog signal and outputs it to the low pass filter 1614.

The low pass filter 1614 filters the analog phase difference signal converted by the D/A converter 1613 and outputs a control voltage of the clock signal generating circuit 162 housing a VCO.

Note that the configuration of the Costas computation circuit 1620 shown in FIG. 8 differs depending on the method of modulation of the carrier wave signal of the OFDM modulated signal. Therefore, the Costas computation circuit 1620 is not necessarily limited to the configuration shown in FIG. 8.

Further, the clock reproduction circuit 1610, as shown in FIG. 8, is comprised so as to fetch the signal corresponding to a specific carrier wave signal among the signal I' and the signal Q' using the registers 1611 and 1612, but it is also possible instead of providing the registers 1611 and 1612 to provide a register directly before the D/A converter 1613 for D/A conversion of just the phase difference corresponding to the specific carrier wave signal by the D/A converter or to control the timing of the conversion by the D/A converter 1613 so as to achieve a predetermined target.

An explanation will be made below of the principle of production of the clock signals CK by the OFDM demodulation apparatus 11.

The reproduced carrier wave signals are accurately reproduced by the carrier wave signal reproduction circuit 126.

The frequency of the clock signal CK (reproduced clock signal) produced by the clock signal generating circuit 162 and used for the processing of the demodulated symbols may sometimes differ from the frequency of the clock signal at the transmission side.

When processing the received OFDM modulated signal using a clock signal with a frequency different from the clock signal on the transmission side, if one notes the carrier wave signal of a predetermined received OFDM modulated signal, it will appear the same as if the frequency of the carrier wave signal were different from the frequency on the transmission side.

For example, when the frequency of the clock signal CK is higher than the frequency of the clock signal on the transmission side, the time window of the DFT of the DFT circuit 121 obtained based on the clock signal CK will become shorter than the time window of the IDFT at the time of production of the OFDM modulated signal at the transmission side.

Accordingly, from the OFDM demodulation apparatus 11, it will appear as if the predetermined carrier wave signal were lower in frequency by the amount of the shortening of the time of the DFT time window and the result of the DFT will also differ from the IDFT input at the transmission side.

That is, the result of the DFT performed based on the clock signal CK in the OFDM demodulation apparatus 11 will be similar to a transformation of a base band signal transformed by a reproduced carrier wave signal deviated from the normal frequency.

Several methods have already been proposed for reproduction of the carrier wave signals from the results of demodulation of the OFDM modulated signal.

In this way, in the OFDM modulated signal, since the frequency deviation of the clock signal CK is equivalent to the frequency deviation of the reproduced carrier wave signal at the time of transforming the OFDM modulated signal to a base band signal, the present invention uses the technique for conventional reproduction of carrier waves for the clock reproduction means.

Further, when considering multiple path interference, basically it may be considered that a delayed multiple path signal has been added to the main signal.

The delayed multiple path signal only gives a slight phase difference to the low frequency signal component, but gives a large phase difference to the high frequency component.

That is, the multiple path signal has different effects on the frequency components of the OFDM modulated signal.

Accordingly, when detecting a phase difference between the reproduced clock signal CK and the various reproduced carrier waves to reproduce a clock signal CK, a different phase difference is detected for each carrier wave signal However, if it is made possible to correctly reproduce the carrier wave signal corresponding to a predetermined base band signal, the frequencies of other carrier wave signals are also correctly reproduced, so it is sufficient to detect the phase difference for the clock reproduction for one wave among the plurality of carrier wave signals of the received OFDM modulated signal.

Fourth Embodiment

A fourth embodiment of the present invention will be explained with reference to FIG. 9.

Figure 9:
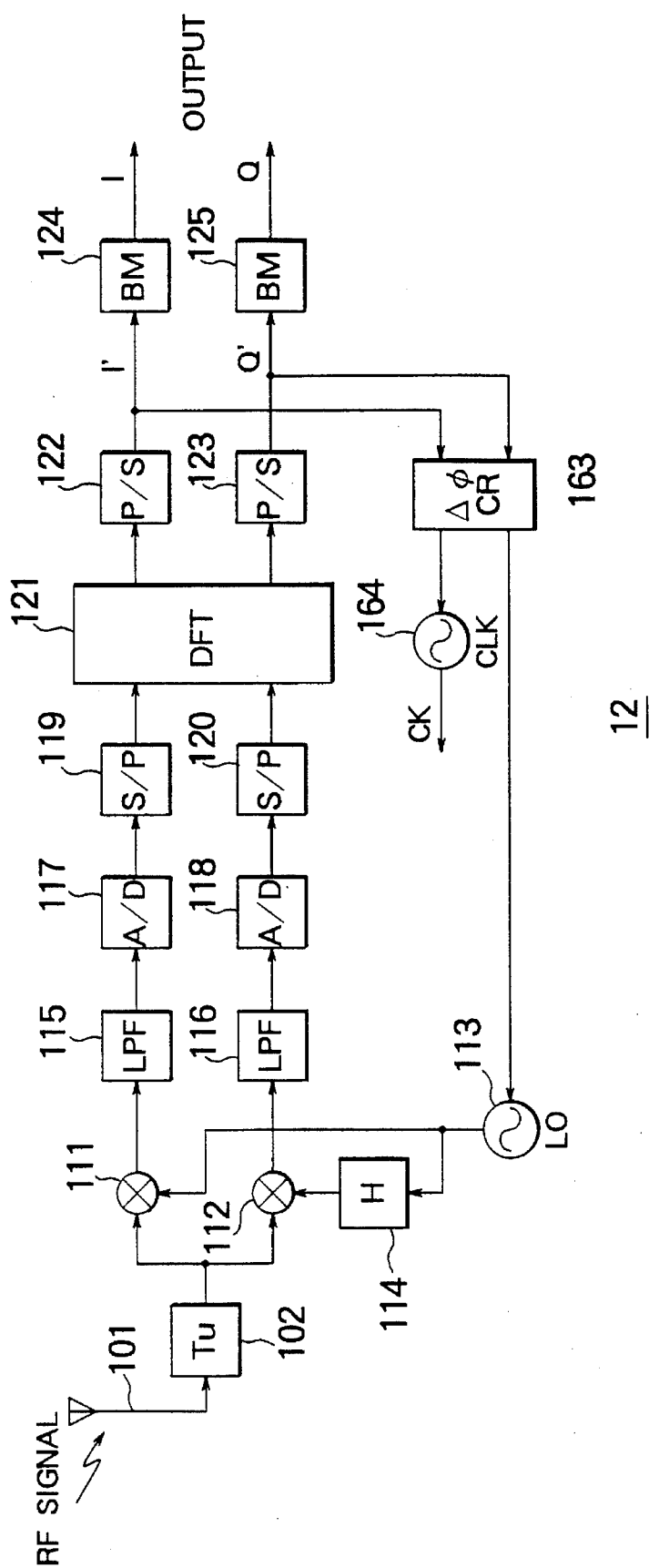
FIG. 9 is a view of the configuration of the OFDM demodulation apparatus according to a fourth embodiment of the present invention.

FIG. 9 is a view of the configuration of the OFDM demodulation apparatus 12 of the fourth embodiment.

Among the portions of the OFDM demodulation apparatus 12 shown in FIG. 9, those portions given the same references as in the OFDM demodulation apparatus 11 shown in FIG. 6 are the same.

The point of difference of the OFDM demodulation apparatus 12 from the OFDM demodulation apparatus 11 is that instead of the carrier wave signal reproduction circuit 126 in the OFDM demodulation apparatus 11, provision is made of the phase error computation circuit 163 in the OFDM demodulation apparatus 12 and that common use is made of the BTR circuit 161 and the carrier wave signal reproduction circuit 126 shown in FIG. 6.

An explanation will now be given of the configuration and operation of the phase error computation circuit 163 referring to FIG. 10.

Figure 10:
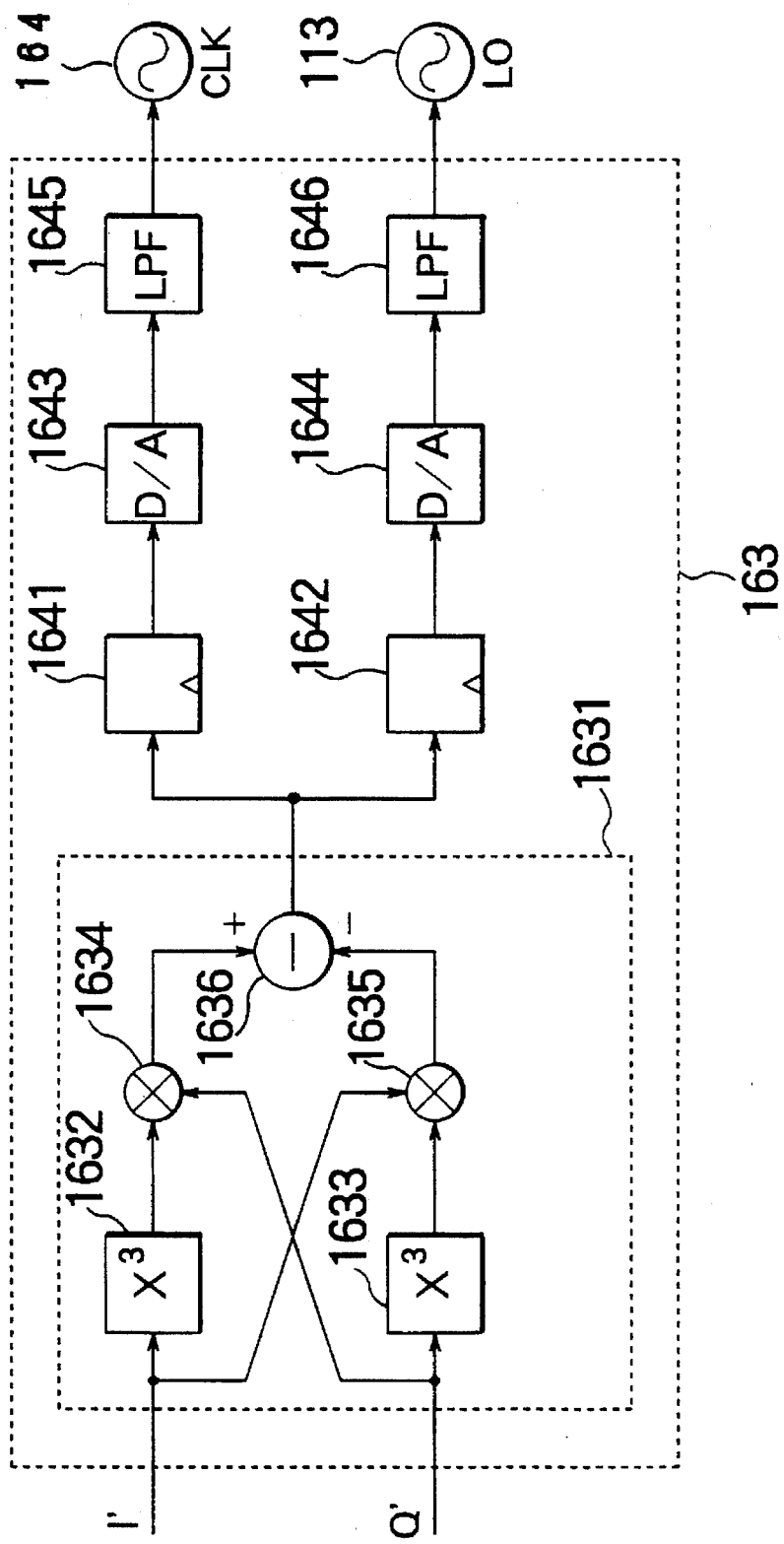
FIG. 10 is a view of the configuration of a phase error computation circuit shown in FIG. 9.

FIG. 10 is a view of the configuration of the phase error computation circuit 163. In FIG. 10, the portion relating to the generation of the time window signal is omitted for simplification of the illustration.

The phase error computation circuit 163 is comprised of a Costas computation circuit 1631 and other portions. The Costas computation circuit 1631 is comprised of the cubing circuits 1632 and 1633, the multipliers 1634 and 1635, and the subtractor 1636.

In the phase error computation circuit 163 there are successively input the base band signals I' and Q' of the carrier wave signals of the OFDM modulated signal transformed by the DFT circuit 121 and converted to serial signals by the P/S converters 122 and 123.

The cubing circuits 1632 and 1633 cube the input signal I' and signal Q' and input the results to the multipliers 1634 and 1635.

The multipliers 1634 and 1635 multiply the results of the cubing of the signal I' and signal Q' input from the cubing circuits 1632 and 1633 and the Q' signal and I' signal.

The subtractor 1636 subtracts the result of multiplication output from the multiplier 1635 from the result of multiplication output from the multiplier 1634, detects the phase difference, and outputs the result to the registers 1641 and 1642.

The registers 1641 and 1642 latch the phase differences corresponding to the respectively different carrier wave signals in the phase differences corresponding to the carrier wave signals input from the subtractor 1636.

For example, when there are n number of carrier wave signals included in a received OFDM modulated signal, the register 1641 latches the phase difference corresponding to the k-th carrier wave signal, while the register 1642 latches the phase difference corresponding to the m-th carrier wave signal and these are output to the D/A converters 1643 and 1644.

Here, n, k, and m are whole integers, $0 \leq k$, $m \leq n$, and k is not equal to m.

The D/A converters 1643 and 1644 convert the phase differences corresponding to the k-th and m-th carrier wave signal latched at the registers 1641 and 1642 into analog signals and output the same to the low pass filters 1645 and 1646.

The low pass filters 1645 and 1646 convert the phase differences input from the registers 1641 and 1642 to analog signals and output them to the clock signal reproduction circuit 164 and the local oscillator 113 as the control voltages for the VCO.

The clock signal generating circuit 164 and the local oscillator 113 oscillate in accordance with the control voltages from the low pass filters 1645 and 1646 and generate the clock signals CK and the carrier waves.

The oscillation frequency of the clock signal generating circuit 164 and the oscillation frequency of the local oscillator 113 differ, so the filtering property of the low pass filter 1645 and the filtering property of the low pass filter 1646 differ.

In this way, the phase error computation circuit 163 generates a control voltage signal for the clock signal generating circuit 164 and the local oscillator 113 based on the output signal of the DFT circuit 121 input from the P/S converters 122 and 123.

The phase error computation circuit 163 also can be modified in the same way as the BTR circuit 161 shown in FIG. 7.

By making the phase error computation circuit 163 the above configuration, it is possible to use the Costas computation circuit 1631 in common for the reproduction of the carrier wave signals and the clock signals and therefore possible to reduce the circuit size.

In the above embodiments, illustration was made of a Costas computation circuit as a phase error detection circuit, but the invention is not limited to a Costas computation circuit.

Further, the computation in the Costas computation circuit was just an example and should be modified in accordance with the modulation method on the transmission side.

In addition to the above, the OFDM demodulation apparatus of the present invention can take various configurations, for example, as shown by the modifications of the embodiments.

As explained above, according to the OFDM demodulation apparatus of the present invention, it is possible to perform the control of the clock generating circuit for each symbol of the OFDM modulated signal, so it is possible to reproduce a clock signal CK with a superior stability.

Further, according to the present invention, it is possible to reproduce a clock signal when receiving a OFDM modulated signal without a synchronization symbol, so the transmission efficiency of the OFDM modulated signal can be improved and further an accurate clock signal CK can be reproduced.

Also, it is possible to make common use of the phase error detection circuit in the carrier wave reproduction circuit and clock reproduction circuit, so the circuit can be made smaller in size.

What is claimed is:

1. An OFDM demodulation apparatus for demodulating an OFDM modulated signal which is comprised of a first component signal including a synchronization symbol and a second component signal including a synchronization signal in an orthogonal relationship with said first component signal, which component signals are multiplexed by orthogonal frequency division, said OFDM demodulation apparatus comprising:

first signal extracting means responsive to a first oscillation frequency for extracting a first component signal from the OFDM modulated signal;

second signal extracting means responsive to said first oscillation frequency for extracting a second component signal from said OFDM modulated signal;

first DFT means for performing DFT on said extracted first component signal in response to a time window signal to generate a first frequency domain component signal;

second DFT means for performing DFT on said extracted second component signal in response to said time window signal to generate a second frequency domain component signal;

clock signal reproduction means for generating a clock signal as a function of said first and second extracted component signals and said synchronization signal;

control voltage generating means for generating a control voltage as a function of said first and second frequency domain component signals, said control voltage corresponding to said synchronization symbol, a local oscillator controlled by said control voltage for generating said first oscillation frequency, and time window signal means for generating said time window signal as a function of said clock signal.

2. A demodulation apparatus according to claim 1, wherein said control voltage generating means comprises a Costas computation circuit and a low pass filter for filtering an output of said Costas computation circuit.

3. A demodulation apparatus according to claim 1, wherein said time window signal generating means divides said clock signal by a predetermined amount to generate said time window signal.

4. A demodulation apparatus according to claim 1, wherein said first signal extracting means includes a first multiplier for performing frequency conversion by multiplying said received OFDM modulated signal and said first oscillation frequency, said second signal extracting means includes means for generating a second oscillation frequency in an orthogonal relationship with said first oscillation frequency and a second multiplier for performing frequency conversion by multiplying said received OFDM modulated signal and said second oscillation frequency.

5. An OFDM demodulation apparatus for demodulating an OFDM modulated signal which is comprised of a first component signal including a synchronization symbol and a second component signal including a synchronization symbol in an orthogonal relationship with said first component signal, which component signals are multiplexed by orthogonal frequency division, said OFDM demodulation apparatus comprising:

first signal extracting means responsive to a first oscillation frequency for extracting a first component signal from said OFDM modulated signal;

second signal extracting means responsive to said first oscillation frequency for extracting a second component signal from said OFDM modulated signal;

first DFT means for performing DFT on said extracted first component signal in response to a time window signal to generate a first frequency domain component signal;

second DFT means for performing DFT on said extracted second component signal in response to said time window signal to generate a second frequency domain component signal;

clock signal reproduction means for generating a clock signal as a function of said first and second frequency domain frequency signals and said synchronization signal;

control voltage generating means for generating a control voltage as a function of said first and second frequency domain component signals, said control voltage corresponding to said synchronization symbol;

a local oscillator controlled by said control voltage for generating a first oscillation frequency to; and time window generating means for generating said time window signal as a function of said clock signal.

6. A demodulation apparatus according to claim 5, wherein said control voltage generating means comprises a Costas computation circuit and a low pass filter for filtering an output of said Costas computation circuit.

7. A demodulation apparatus according to claim 5, wherein said first signal extracting means includes a first multiplier for performing frequency conversion by multiplying said received OFDM modulated signal and said first oscillation frequency, said second signal extracting means includes means for generating a second oscillation frequency in an orthogonal relationship with said first oscillation frequency and a second multiplier for performing frequency conversion by multiplying said received OFDM modulated signal and said second oscillation frequency.

8. A demodulation apparatus according to claim 5, wherein said clock signal reproduction means comprises a Costas computation circuit and a low pass filter for filtering an output of said Costas computation circuit.

9. A demodulation apparatus according to claim 5, wherein said time window signal generating means divides said clock signal by a predetermined amount to generate said time window signal.

10. A demodulation apparatus according to claim 5, wherein said control voltage generating means and said clock signal reproduction means are included in a phase error computation circuit comprised of a Costas computation circuit and a low pass filter for filtering an output of said Costas computation circuit.

\* \* \* \* \*